US012659820B2

(12) United States Patent
Zhang et al.

(10) Patent No.: US 12,659,820 B2
(45) Date of Patent: Jun. 16, 2026

(54) METHOD FOR SERVICE CONTINUITY

(71) Applicant: ZTE CORPORATION, Shenzhen (CN)

(72) Inventors: Man Zhang, Shenzhen (CN); Zhuang Liu, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 338 days.

(21) Appl. No.: 18/330,415

(22) Filed: Jun. 7, 2023

(65) Prior Publication Data

US 2023/0397059 A1 Dec. 7, 2023

Related U.S. Application Data

(63) Continuation of application No. PCT/CN2020/138636, filed on Dec. 23, 2020.

(51) Int. Cl.
*H04W 36/00* (2009.01)
*H04W 68/00* (2009.01)
*H04W 84/04* (2009.01)

(52) U.S. Cl.
CPC ...... *H04W 36/0072* (2013.01); *H04W 68/005* (2013.01); *H04W 84/042* (2013.01)

(58) Field of Classification Search
CPC ........... H04W 36/0072; H04W 68/005; H04W 84/042; H04W 36/12; H04W 76/27; H04W 76/16

See application file for complete search history.

(56) References Cited

U.S. PATENT DOCUMENTS 10,237,912 B2 * 3/2019 Agiwal .................. H04W 72/04
2016/0286447 A1 * 9/2016 Sharma .................. H04W 76/34
(Continued)

FOREIGN PATENT DOCUMENTS

CN 102857969 A * 1/2013 ............ H04W 76/36
CN 111182543 A 5/2020
(Continued)

OTHER PUBLICATIONS

"3rd Generation Partnership Project; Technical Specification Group Services and System Aspects; Procedures for the 5G System; Stage 2 (Release 15)", Mar. 27, 2018 (Mar. 27, 2018). (Year: 2018).*
(Continued)

*Primary Examiner* — Yuwen Pan
*Assistant Examiner* — Swati Jain
(74) *Attorney, Agent, or Firm* — Foley & Lardner LLP

(57) ABSTRACT

A wireless communication method for use in a first wireless network node of a first network is disclosed. The method comprises establishing, for at least one service, connections between a wireless terminal and a first core network of the first network and between the wireless terminal and a second core network of one of at least one second network, wherein the first network is one of a public land mobile network or a non-public network and the at least one second network is another one of the public land mobile network or the non-public network, and transmitting, to the wireless terminal, a release message of releasing the wireless terminal to an inactive mode, transmitting, to the wireless terminal, a paging message associated with a paging core network, wherein the paging core network comprises at least one of the first core network or the second core network.

17 Claims, 10 Drawing Sheets

(56) References Cited

U.S. PATENT DOCUMENTS

| | | | | |
|---|---|---|---|---|
| 2020/0037218 A1* | 1/2020 | Karampatsis | ....... | H04W 36/087 |
| 2020/0305118 A1* | 9/2020 | Ryu | ..................... | H04W 76/10 |
| 2021/0258869 A1* | 8/2021 | Di Girolamo | ......... | H04W 4/70 |
| 2022/0053452 A1* | 2/2022 | Geng | ................. | H04W 68/005 |
| 2022/0256440 A1* | 8/2022 | Rönneke | .............. | H04W 48/06 |
| 2023/0389049 A1* | 11/2023 | Kim | ........................ | H04W 4/06 |
| 2023/0422208 A1* | 12/2023 | Ryu | .................... | H04W 68/005 |
| 2024/0340853 A1* | 10/2024 | Park | ..................... | H04L 5/0048 |
| 2025/0008381 A1* | 1/2025 | Zhang | ................... | H04W 76/27 |

FOREIGN PATENT DOCUMENTS

| | | | | | | |
|---|---|---|---|---|---|---|
| CN | 111512692 A | * | 8/2020 | ......... | H04L 65/1016 |
| CN | 111867057 A | | 10/2020 | | |
| EP | 3713370 A1 | * | 9/2020 | ............ | H04W 76/10 |
| WO | WO-2019219209 A1 | * | 11/2019 | .......... | H04L 63/164 |
| WO | WO-2020098609 A1 | * | 5/2020 | ............ | H04W 36/14 |
| WO | WO-2020/186092 A2 | | 9/2020 | | |

OTHER PUBLICATIONS

Nokia et al., "Discussion of security solutions for SNPN service access via PLMN and vice versa", 3GPP TSG-SA WG3 Meeting #94Ad-Hoc, S3-190850, Mar. 15, 2019, Stockholm, Sweden (4 pages). (Year: 2019).*

3rd Generation Partnership Project; Technical Specification Group Services and System Aspects; Procedures for the 5G System; Stage 2 (Release 15), 3GPP TS 23.502 v15.1.0 (Mar. 2018), 284 pages.

Extended European Search Report for EP Appl. No. 20966386.3, dated Oct. 30, 2023 (9 pages).

International Search Report and Written Opinion for PCT Appl. No. PCT/CN2020/138636, mailed on Sep. 26, 2021 (8 pages).

Nokia et al., "Discussion of security solutions for SNPN service access via PLMN and vice versa", 3GPP TSG-SA WG3 Meeting #94Ad-Hoc, S3-190850, Mar. 15, 2019, Stockholm, Sweden (4 pages).

* cited by examiner

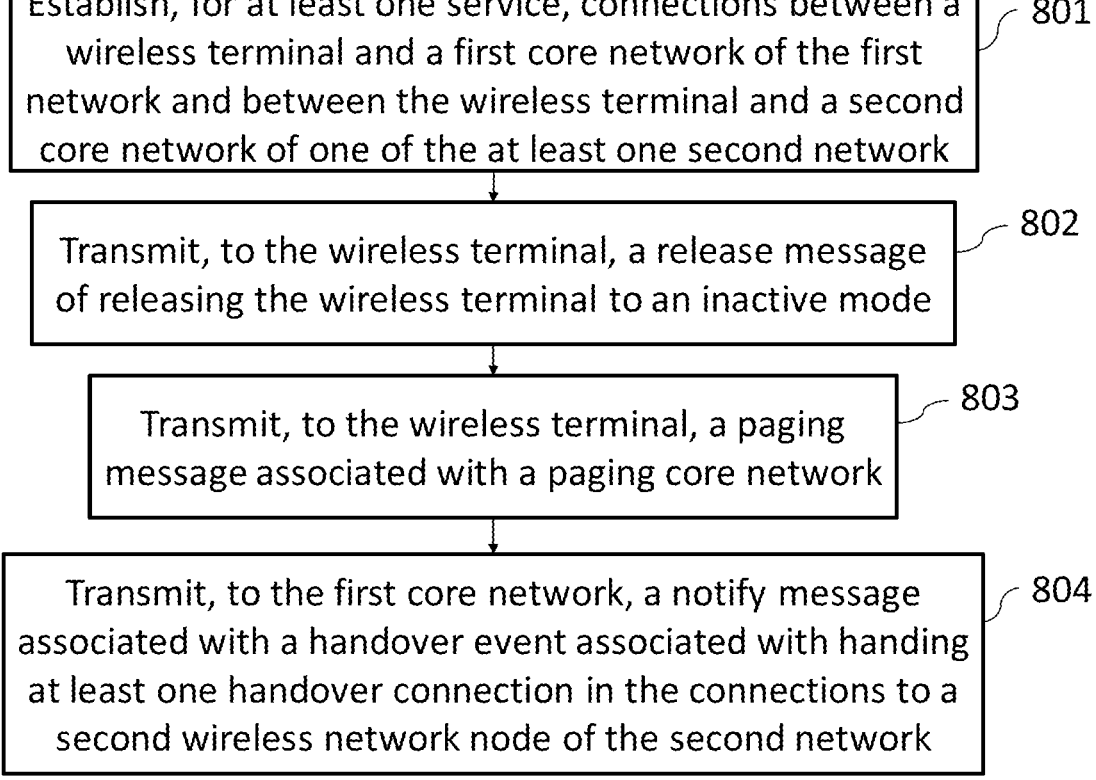

Establish, for at least one service, connections between a wireless terminal and a first core network of the first network and between the wireless terminal and a second core network of one of the at least one second network — 801

Transmit, to the wireless terminal, a release message of releasing the wireless terminal to an inactive mode — 802

Transmit, to the wireless terminal, a paging message associated with a paging core network — 803

Transmit, to the first core network, a notify message associated with a handover event associated with handing at least one handover connection in the connections to a second wireless network node of the second network — 804

FIG. 8

Establish, for at least one service, a connection with a wireless terminal via a first wireless network node — 1001

Receive, from the first wireless network node, a notify message associated with a handover event associated with handing at least one handover connection to a second wireless network node of a second network — 1002

METHOD FOR SERVICE CONTINUITY

This application is a continuation of PCT/CN2020/138636, filed Dec. 23, 2020, the content of which is incorporated herein by reference in its entirety.

TECHNICAL FIELD

This document is directed generally to wireless communications.

BACKGROUND

Within various kinds of services realized in the wireless communications, video, imaging and audio for professional applications (VIAPA) services may need to consider service continuity requirements.

SUMMARY

For user equipment (UE) that has subscriptions to two networks (e.g., one public land mobile network (PLMN) and one standalone non-public network (SNPN)), the UE may be able to register to at least one of core networks of these two subscribed networks for requesting the VIAPA services. In a scenario, the UE may change from the currently used network to another network when service quality of the currently used network cannot satisfy the requirements of the VIAPA services or the coverage of the currently used network is not available. Under such conditions, the network system is required to support the service continuity for maintaining acceptable performance while switching between co-located networks (e.g., PLMN and SNPN), e.g., due to mobility. That is, the service continuity is needed to be considered when the UE changes from one network to another network for services, so as to provide high service quality and maintain the service continuity for users.

This document relates to methods, systems, and devices for the service continuity, and in particular to methods, systems, and devices for the service continuity of a wireless terminal switching between two networks.

The present disclosure relates to a wireless communication method for use in a first wireless network node of a first network. The method comprises:

establishing, for the at least one service, connections between the a wireless terminal and a first core network of the first network and between the wireless terminal and a second core network of one of at least one second network, wherein the first network is one of a public land mobile network or a non-public network and the at least one second network is another one of the public land mobile network or the non-public network, transmitting, to the wireless terminal, a release message of releasing the wireless terminal to an inactive mode, transmitting, to the wireless terminal, a paging message associated with a paging core network, wherein the paging core network comprises at least one of the first core network or the second core network, and transmitting, to the first core network, a notify message associated with a handover event of handing at least one handover connection in the connections to a second wireless network node of the second network.

Various embodiments may preferably implement the following features:

Preferably or in some implementations, the establishing, for the at least one service, the connections between the wireless terminal and the first core network of the first network and between the wireless terminal and the second core network of one of the at least one second network comprises at least one of:

transmitting, to the first core network, an initial message of requiring resources for the at least one service, or receiving, from the first core network, a resource setup request message of establishing the connections between the wireless terminal and the first core network and between the wireless terminal and the second core network via the first wireless network node.

Preferably or in some implementations, the initial message comprises at least one of:

an indication of keeping the wireless terminal being released to the inactive mode, identifier information of the at least one second network selected by the wireless terminal, or the at least one service.

Preferably or in some implementations, the resource setup request message comprises at least one of:

an indication of keeping the wireless terminal being released to the inactive mode, identifier information of the second network corresponding to the second core network, the at least one service, setup information for the connection between the wireless terminal and the first core network, or setup information for the connection between the wireless terminal and the second core network.

Preferably or in some implementations, the release message is transmitted based on at least one of an indication of keeping the wireless terminal being released to the inactive mode, quality of service flow information of the at least one service, or at least one service type of the at least one service.

Preferably or in some implementations, the wireless communication method further comprises receiving, from the paging core network, the paging message.

Preferably or in some implementations, the wireless communication method further comprises transmitting data on the connection between the wireless terminal and the paging core network.

Preferably or in some implementations, the connection between the wireless terminal and the paging core network is established after transmitting the paging message to the wireless terminal.

Preferably or in some implementations, the wireless communication method further comprises:

receiving, from the first core network, a request message indicating at least one handover of handing the at least one handover connection to the second wireless network node, and transmitting, to the wireless terminal, a reconfiguration message of performing the at least one handover.

Preferably or in some implementations, the notify message comprises at least one of:

at least one quality of experience, QoE, measurement result of the at least one service, an indication of at least one quality of service, QoS, requirement of the at least one service is unfulfilled, information of at least one QoS flow associated with at least one QoS requirement which is unfulfilled, or information associated with the at least one handover connection.

Preferably or in some implementations, the wireless communication method further comprises receiving, from the wireless terminal, at least one measurement report indicating the handover event.

Preferably or in some implementations, the at least one measurement report comprises at least one of:

at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

Preferably or in some implementations, the wireless communication method further comprises receiving, from the wireless terminal, a connection request message associated with the at least one service, wherein the connection request message comprises at least one of:

information associated with the at least one second network selected by the wireless terminal, or the at least one service.

Preferably or in some implementations, the wireless communication method further comprises transmitting, to the wireless terminal, untrusted access information, wherein the untrusted access information comprises at least one of:

an indication of whether the first wireless network node supports establishing the connection between the wireless terminal and the at least one second network, identifier information of the at least one second network supported by the first wireless network node, or at least one service type supported by the first wireless network node for establishing the connection between the wireless terminal and the at least one second network.

Preferably or in some implementations, the transmitting, to the wireless terminal, the untrusted access information comprises:

transmitting, from a distributed unit of the first wireless network node to a centralized unit of the first wireless network node, the untrusted access information, and transmitting, from the centralized unit to the distributed unit, encoded untrusted access information, and broadcasting, by the distributed unit, the encoded untrusted access information.

Preferably or in some implementations, the encoded untrusted access information is configured in at least one master information block and/or at least one system information block.

The present disclosure relates to a wireless communication method for a wireless terminal, the method comprising:

establishing, for at least one service, connections with a first core network of a first network and a second core network of one of at least one second network via a first wireless network node of the first network, wherein the first network is one of a public land mobile network or a non-public network and the at least one second network is another one of the public land mobile network or the non-public network, and receiving, from the first wireless network node, a release message of releasing the wireless terminal to an inactive mode, receiving, from the first wireless network node, a paging message associated with a paging core network, wherein the paging core network comprises at least one of the first core network or the second core network.

Various embodiments may preferably implement the following features:

Preferably or in some implementations, the wireless communication method further comprises receiving, from the first wireless network node, untrusted access information associated with the at least one second network, wherein the untrusted access information comprises at least one of:

an indication of whether the first wireless network node supports establishing at least one connection between the wireless terminal and the at least one second network, identifier information of the at least one second network supported by the first wireless network node, or at least one service type supported by the first wireless network node for establishing the at least one connection between the wireless terminal and the at least one second network.

Preferably or in some implementations, the wireless communication method further comprises transmitting, to the first wireless network node, a connection request associated with the at least one service, wherein the connection request message comprises at least one of:

information associated with the at least one second network selected by the wireless terminal, or the at least one service.

Preferably or in some implementations, the wireless communication method further comprises communicating with the paging core network on the connection between the wireless terminal and the paging core network.

Preferably or in some implementations, the connection between the wireless terminal and the paging core network is established after receiving the paging message from the first wireless network node.

Preferably or in some implementations, the wireless communication method further comprises receiving, from the first network node, a reconfiguration message of performing at least one handover of handing at least one handover connection in the connections between the wireless terminal and the first core network and between the wireless terminal and the second core network to a second wireless network node of the second network.

Preferably or in some implementations, the wireless communication method further comprises transmitting, to the first wireless network node, at least one measurement report indicating a handover event associated with the at least one handover connection.

Preferably or in some implementations, the at least one measurement report comprises at least one of:

at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

The present disclosure relates to a wireless communication method for use in a first core network of a first network, the method comprising:

establishing, for at least one service, a connection with a wireless terminal via a first wireless network node, and receiving, from the first wireless network node, a notify message associated with a handover event associated with handing at least one handover connection to a second wireless network node of a second network, wherein the at least one handover connection comprises at least one of the connection between the first core network and the wireless terminal and a connection between a second core network of the wireless network via the first wireless network node, wherein the first network is one of a public land mobile network or a non-public network and the second network is another one of the public land mobile network or the non-public network.

Various embodiments may preferably implement the following features:

Preferably or in some implementations, the wireless communication method further comprises at least one of:

receiving, from the first wireless network node, an initial message of requiring resources for the at least one service, or transmitting, to the first wireless network node, a resource setup request message of establishing the connections between the wireless terminal and the first core network and between the wireless terminal and the second core network via the first wireless network node.

Preferably or in some implementations, the initial message comprises at least one of:

an indication of keeping the wireless terminal being released to an inactive mode, identifier information of the at least one second network selected by the wireless terminal, or the at least one service.

Preferably or in some implementations, the resource setup request message comprises at least one of:

an indication of keeping the wireless terminal being released to an inactive mode, identifier information of the second network corresponding to the second core network, the at least one service, setup information for the connection between the wireless terminal and the first core network, or setup information for the connection between the wireless terminal and the second core network.

Preferably or in some implementations, the wireless communication method further comprises transmitting, to the first wireless network node or the wireless terminal, a request message indicating at least one handover of handing the at least one handover connection to the second wireless network node.

Preferably or in some implementations, the notify message comprises at least one of:

at least one quality of experience, QoE, measurement result of the at least one service, an indication of at least one quality of service, QoS, requirement of the at least one service is unfulfilled, information of at least one QoS flow associated with at least one QoS requirement which is unfulfilled, or information associated with the at least one handover connection.

The present disclosure relates to a first wireless network node of a first network. The first wireless network node comprises:

a processor, configured to establish, for the at least one service, connections between the a wireless terminal and a first core network of the first network and between the wireless terminal and a second core network of one of the at least one second network, wherein the first network is one of a public land mobile network or a non-public network and the at least one second network is another one of the public land mobile network or the non-public network, and a communication unit, configured to:

transmit, to the wireless terminal, a release message of releasing the wireless terminal to an inactive mode, transmit, to the wireless terminal, a paging message associated with a paging core network, wherein the paging core network comprises at least one of the first core network or the second core network, and transmit, to the first core network, a notify message associated with a handover event associated with handing at least one handover connection in the connections to a second wireless network node of the second network.

Various embodiments may preferably implement the following feature:

Preferably or in some implementations, the processor is further configured to perform any of aforementioned wireless communication methods.

The present disclosure relates to a wireless terminal. The wireless terminal comprises:

a processor, configured to establish, for at least one service, connections with a first core network of a first network and a second core network of one of at least one second network via a first wireless network node of the first network, wherein the first network is one of a public land mobile network or a non-public network and the at least one second network is another one of the public land mobile network or the non-public network, and a communication unit, configured to:

receive, from the first wireless network node, a release message of releasing the wireless terminal to an inactive mode, receive, from the first wireless network node, a paging message associated with a paging core network, wherein the paging core network comprises at least one of the first core network or the second core network.

Various embodiments may preferably implement the following feature:

Preferably or in some implementations, the processor is further configured to perform any of aforementioned wireless communication methods.

The present disclosure relates to a first core network of a first network. The first core network comprises:

a processor, configured to establish, for at least one service, a connection with a wireless terminal via a first wireless network node, and a communication unit, configured to:

receive, from the first wireless network node, a notify message associated with a handover event associated with handing at least one handover connection to a second wireless network node of a second network, wherein the at least one handover connection is in the connection between the first core network and the wireless terminal and a connection between a second core network of the wireless network via the first wireless network node, wherein the first network is one of a public land mobile network or a non-public network and the second network is another one of the public land mobile network or the non-public network.

Various embodiments may preferably implement the following feature:

Preferably or in some implementations, the processor is further configured to perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF DRAWINGS

FIG. 8 shows a flowchart of a process according to an embodiment of the present disclosure.

DESCRIPTION OF EMBODIMENTS

A public land mobile network (PLMN) is a network providing public services and is identified by a PLMN identifier (ID). In addition, a standalone non-public network (SNPN) is a network deployed for non-public use which does not rely on network functions provided by the PLMN. The SNPN is identified by a PLMN ID and network ID (NID).

Access networks in 5G systems can be either trusted for 3 rd generation partner project (3GPP) access or untrusted for non-3GPP access. For the untrusted access (e.g., non- 3GPP access) networks, an internet protocol security (IPsec) tunnel is established between a UE and a Non-3GPP interworking function (N3IWF).

In the present disclosure, the 3GPP access may be equal to trusted access and the non-3GPP access may be equal to untrusted access.

Figure 1:
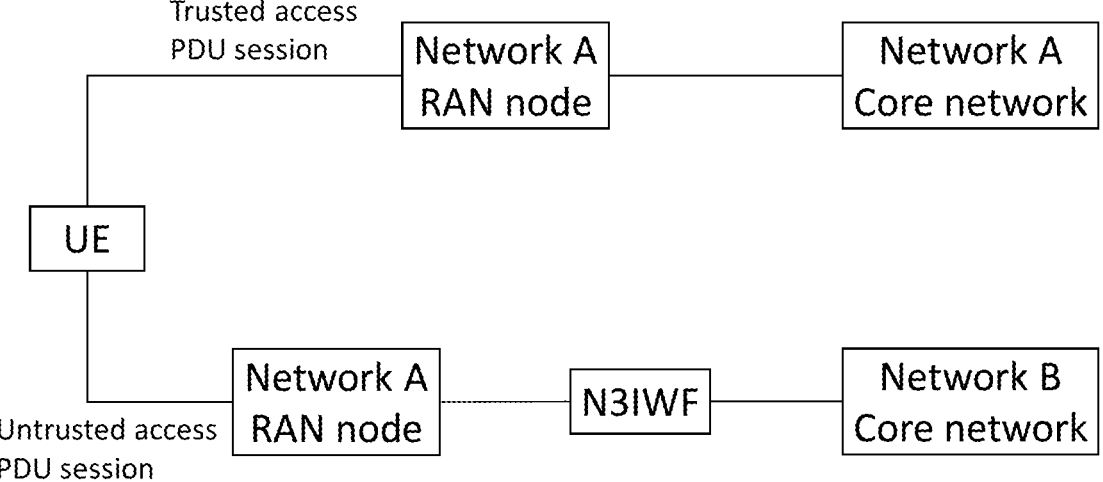
FIG. 1 shows a schematic diagram of a network system according to an embodiment of the present disclosure.

FIG. 1 shows a schematic diagram of a network system according to an embodiment of the present disclosure. In FIG. 1, the UE may have subscriptions for both a network A and a network B (e.g., an SNPN and a PLMN) and is in an area where the coverage of the network A is available. Under such conditions, the UE may establish a trusted access packet data unit (PDU) session (e.g., 3GPP access PDU session) towards to the core network (e.g., 5G core network (5GC)) of the network A via the radio access network (RAN) node of the network A, to access services provided by the core network of the network A. As an alternative or in addition, the UE may establish an untrusted access PDU session (e.g., non-3GPP access PDU session) for the IPsec tunnel towards to the core network of the network B via the N3IWF and the RAN node of the network A, to access services provided by the core network of the network B. Note that, the RAN node of network A may be called a serviced RAN node, which has a Uu air interface with the UE.

In the present disclosure, the RAN node may be equal to a next generation NodeB (gNB), an EN-gNB (Evolved Universal Terrestrial Radio Access (E-UTRA) new radio gNB)), an evolved NodeB (eNB), a next generation eNB (NG-eNB), or an NG-RAN node.

Figure 2:
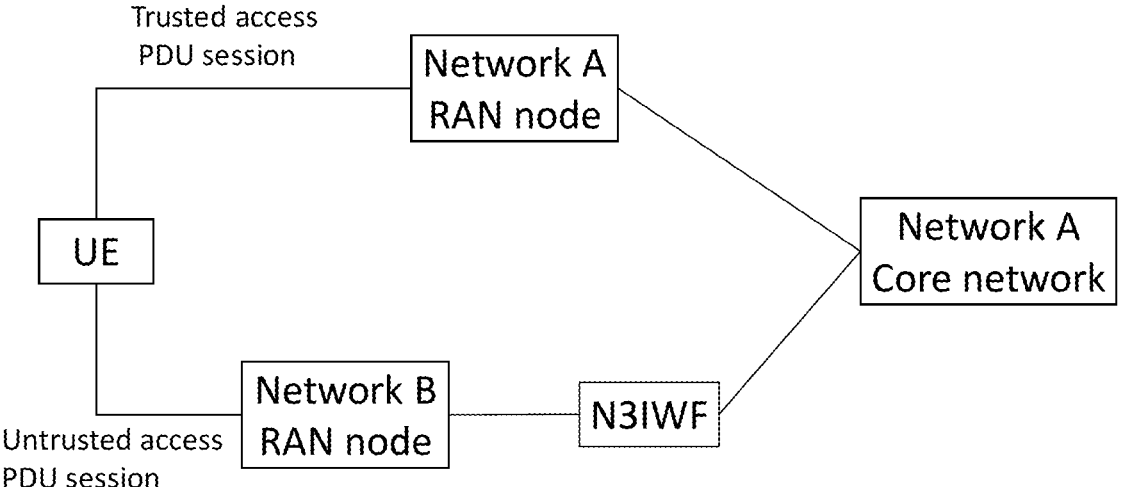
FIG. 2 shows a schematic diagram of a network system with an overlapping radio coverage area according to an embodiment of the present disclosure.

FIG. 2 shows a schematic diagram of a network system with an overlapping radio coverage area according to an embodiment of the present disclosure. In the overlapping radio coverage area, the coverages of both the network A and network B are available. When the coverage of the network A is available, the UE may establish a trusted access PDU session (e.g., 3GPP access PDU session) towards to the core network of the network A via the RAN node of the network A, to access services provided by the core network of the network A. Here, the RAN node of the network A is a serviced RAN node, which has a Uu air interface with the UE.

When the coverage of the network B is available (and the coverage of network A is not available), the UE may establish an untrusted access PDU session (e.g., non-3GPP access PDU session) for an IPsec tunnel towards to the core network (e.g., 5GC) of the network A via the N3IWF and the RAN node of the network B, to access services provided by the core network of the network A. Here, the serviced RAN node is switched from the RAN node of the network A to that of the network B.

Figure 3:
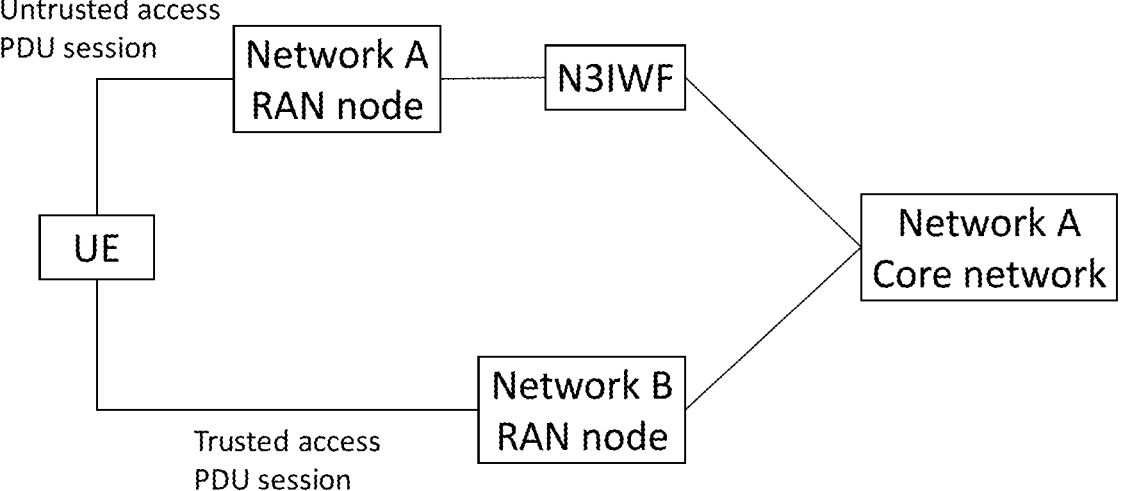
FIG. 3 shows a schematic diagram of a network system with an overlapping radio coverage area according to an embodiment of the present disclosure.

FIG. 3 shows a schematic diagram of a network system with an overlapping radio coverage area according to an embodiment of the present disclosure. In FIG. 3, the UE establishes an untrusted access PDU session (e.g., non-3GPP access PDU session) towards the core network of the network B via the RAN node of the network A and the N3IWF, to access the service provided by the core network of the network B. When the coverage of the network A is not available and the coverage of the network B is available, the UE may switch from the untrusted access PDU session to a trusted access PDU session (e.g., 3GPP access PDU session) towards the core network of the network B via the RAN node of the network B.

In the scenarios shown in FIG. 2 or FIG. 3, the following issues may need to be considered:

how does the UE acknowledge that whether a RAN node supports the untrusted access and/or whether a RAN node is able to establish the untrusted access PDU session;

how to keep the service continuity of the UE when the US switches between the trusted access PDU session and untrusted access PDU session;

how to enable the UE to receive data services from one network (e.g., SNPN) and paging as well as data services from another network (e.g., PLMN) simultaneously;

how to improve the latency to page the UE to resume a service provided by the overlay network.

Embodiment 1

Figure 4:
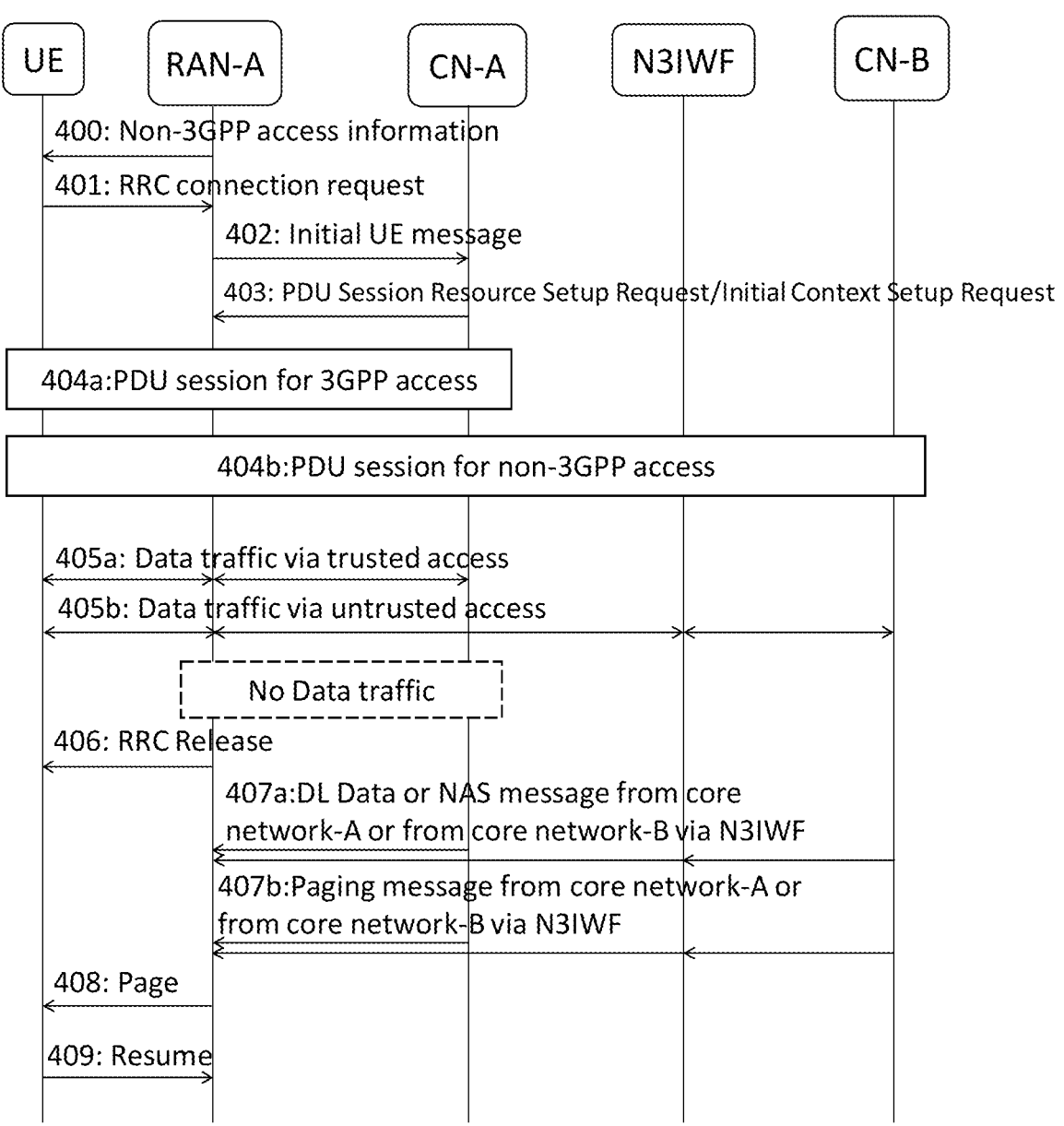
FIG. 4 shows a schematic diagram of a resume procedure according an embodiment of the present disclosure.

FIG. 4 shows a schematic diagram of a resume procedure according an embodiment of the present disclosure. Note that, the network A and the network B are networks of different types. In an embodiment, the network A is one of the public network and private network, and the network B is another one of the public network and private network. For example, the network A is a PLMN and the network B is an SNPN. As an alternative, the network A is an SNPN and the network B is a PLMN. In FIG. 4, the RAN node of the network A is named RAN-A, the core network of the network A is called CN-A and the core network of the network B is represented by CN-B.

In step 400, the RAN-A broadcasts non-3GPP access information of the cell. In this embodiment, the non-3GPP access information includes at least one of the following items:

an indication of whether a cell of network A supports the UE to connect to CN-B via the N3IWF;

supported network B information, which includes one or more network B IDs of the non-3GPP accessed network B supported by the cell of the network A via the N3IWF (for example, if network B is the PLMN, the network B ID is a PLMN ID; and if network B is a SNPN, the network B ID comprises PLMN ID and NID);

supported service types that require the service continuity (e.g., VIAPA service).

In step 401, based on the received non-3GPP access information of the specific cell, and the UE selects at least one network B for the non-3GPP access (the selected network B may be included in the broadcast non-3GPP access information) and sends an RRC message (e.g., RRC Connection Request message) through the radio interface to request resources for the services that require the service continuity. In an embodiment, the RRC message includes at least one of the following information:

selected network B information, which includes one or more network B IDs of the network B supported and/or selected by the UE;

service types that require service continuity (e.g., VIAPA service)

In step 402, after receiving the RRC message from UE, the RAN-A sends an NGAP message (e.g., initial UE message) to the CN-A to request resources for the services that require the service continuity. In an embodiment, the NGAP message comprises at least one of the following information:

an indication indicating that the UE is always released to an inactive mode (e.g., RRC_Inactive mode), e.g., in order to keep the service continuity and reduce latency of paging users and resuming services;

support network B information received in the RRC message in step 401;

service types that require service continuity received in the RRC message in step 401.

In step 403, the CN-A selects one possible network B for the UE to connect according to the received information in the NGAP message sent by the RAN-A in step 402, and sends an NGAP message (e.g., PDU session Resource establishment Request and/or Initial Context Setup Request) to the RAN-A for establishing at least one PDU session for 3GPP access and/or non-3GPP access. In an embodiment, the NGAP message in step 403 includes at least one of the following information:

an indication indicating that UE is always released to the inactive mode selected network B ID for the non-3gpp access;

service types that require the service continuity (e.g., VIAPA service);

setup PDU session information for the 3GPP access;

setup PDU session information for the non-3GPP access.

Based on the NGAP message transmitted in step 403, at least one of steps 404a and 404b is performed.

In step 404a, if the setup PDU session information for 3GPP access is included in the received NGAP message in step 403, the RAN-A establishes the 3GPP access PDU session in the network A according to the setup PDU session information for 3GPP access in the received NGAP message in step 403.

In step 404b, if the setup PDU session information for non-3GPP access is included in the received NGAP message in step 403, the RAN node establishes non-3GPP access PDU session in network A via the N3IWF towards the CN-B according to the setup PDU session information for non-3GPP access.

In an embodiment, steps 404a and step 404b could be performed simultaneously. That is, the CN-A may indicate the RAN-A to setup two PDU sessions including both the setup PDU session information for 3GPP and non-3GPP accesses in the NGAP message. As an alternative, the CN-A may indicate the RAN node to establish at least one PDU session for one of 3GPP access and non-3GPP access and, if needed, the CN-A may indicate the RAN-A to setup at least one PDU session for another one of 3GPP access and non-3GPP access by sending a new message to the RAN-A. In an embodiment, establishing both two PDU sessions (one 3GPP access PDU session between the UE and the CN-A and one non-3GPP access PDU session between the UE and CN-B) may result in better performance. For example, the UE may be able to receives data services from one network (e.g., NPN) and paging as well as data services from another network (e.g., PLMN) with a low latency.

In step 405, after the establishments of PDU session(s), data traffic could be transferred through the RAN-A to the UE via the 3GPP access (step 405a) for service(s) of the CN-A and/or through the RAN-A to the UE via the non-3GPP access (step 405b) for service(s) of the CN-B.

In step 406, when the RAN-A decides to release the UE (e.g., when there is no data traffic from core network for a period of time), the RAN-A sends the UE an RRC release message including an indication for transferring to the inactive mode, e.g., according to the indication indicating that UE is always released to the inactive mode received in step 403. In an embodiment, the RAN-A does not receive the indication indicating that UE is always released to the inactive mode during the step 403, the RAN-A may determine that whether it is preferred to release the UE to the inactive mode based on QoS flow information in the setup PDU session information and/or based on the service types that require the service continuity received during the step 403.

In step 407, after UE is released to the inactive mode, there might be DL data and/or NAS message from the CN-A and/or form the CN-B via the N3IWF (step 407a), which may trigger a paging procedure for the UE at the RAN-A. As an alternative or in addition, there may be a paging message from the CN-A and/or form the CN-B via the N3IWF, which would also trigger the paging procedure at the RAN-A.

In step 408, the RAN-A pages the UE by transmitting a paging message (i.e., initiating the paging procedure). In an embodiment, the paging message includes paging network information to indicate the UE that the network paging the UE (i.e., network A or network B).

In step 409, the UE resumes to a connected mode (e.g., RRC_CONNECTED mode) after being paged by the RAN-A and resumes data traffic transmissions with the network. Note that, in step 404, it is possible that only one PDU session (for 3GPP access or non-3GPP access) is established between the UE and the core network of one of the network A and network B. If there is no existing PDU session towards the core network of the paging network (i.e., the network paging the UE) indicated by the paging message, the UE may trigger (e.g., initiate) a PDU session establishment procedure towards the core network of the paging network and receive the data traffic from the core network of the paging network over the newly established PDU session.

Embodiment 2

Figure 5:
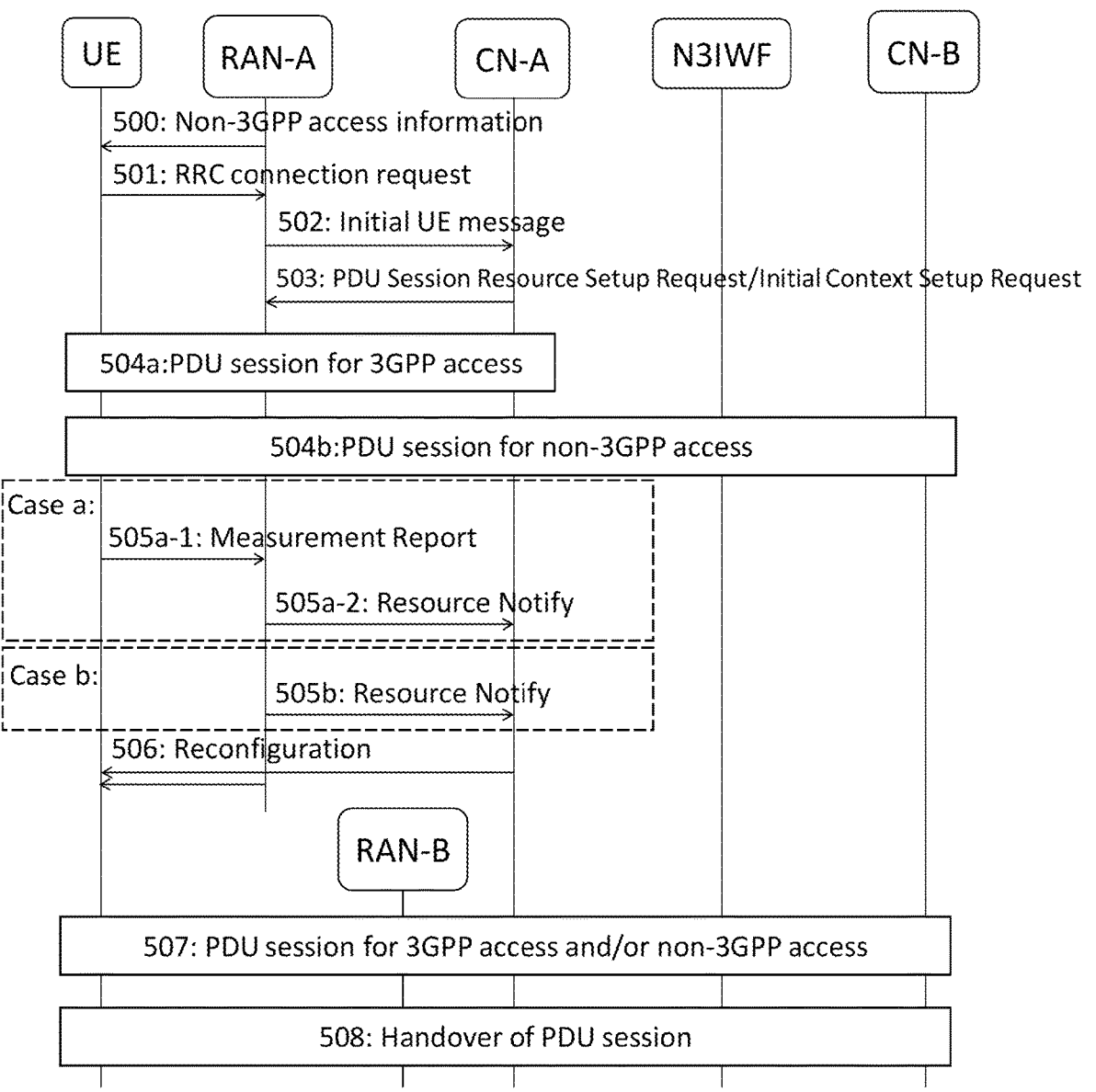
FIG. 5 shows a schematic diagram of a resume service procedure according to an embodiment of the present disclosure.

FIG. 5 shows a schematic diagram of a resume service procedure according to an embodiment of the present disclosure. In FIG. 5, the RAN node of the network A is named RAN-A, the core network of the network A is called CN-A, the RAN node of the network B is named RAN-B, and the core network of the network B is represented by CN-B.

In FIG. 5, steps 500 to 504b are similar to steps 400 to 404b shown in FIG. 4 and are not illustrated herein. In this embodiment, there is an overlapping radio coverage area where the coverages of both the Network A and Network B are available. In an embodiment, a handover from the 3GPP access PDU session and/or the non-3GPP session of the RAN-A (e.g., serviced RAN) to the non-3GPP access PDU session and/or 3GPP access PDU session of the RAN-B (e.g., target RAN node) may be triggered (e.g., performed), e.g., when the RAN-A is not available (e.g., the quality of the radio interface between the UE and the RAN-A cannot satisfy the requirements of certain services (e.g., VIAPA services)).

More specifically, the handover may be performed between the 3GPP access PDU session of the RAN-A to the non-3GPP access PDU session of the RAN-B and/or between the non-3GPP access PDU session of the RAN-A to the 3GPP access PDU session of the RAN-B. In addition, this handover may be triggered in the following two cases:

Case a: When the UE detects (e.g., determines) that the quality-of-service (QoS) requirements of the specific services (e.g., VIAPA services) cannot be fulfilled, the UE may send a measurement report to the RAN-A to notice the current network situation, e.g., to trigger the handover. Based on the measurement report, the RAN-A sends a notify message (e.g., PDU session Resource Notify message) to the CN-A to notify that the established QoS flows cannot fulfill the requirements of the specific services anymore.

Case b: The RAN-A itself detects (e.g., determines) that the QoS requirements of specific services cannot be fulfilled anymore and/or a radio link failure (RLF) happens between the UE and the RAN-A, and the RAN-A sends a notify message (e.g., PDU session Resource Notify message) to the CN-A to notify that the established QoS flows cannot be fulfilled the requirements anymore. More details of the case a and case b are illustrated in the following.

Case a:

In step 505a-1, the UE detects that the QoS requirements of one or more QoS flows cannot be fulfilled and sends the measurement report(s) to the RAN-A to notify the RAN-A about this situation. In an embodiment, the measurement report includes at least one of the following items:

measurement results of quality-of-experience (QoE) of the services;
    an indication of whether the QoS requirements are fulfilled;
    the ID(s) of QoS flows of which the QoS requirements cannot be fulfilled;
    ID of target RAN (e.g., RAN-B) recommended (e.g., selected) by the UE.

In step 505a-2, the RAN-A receives the measurement report from the UE and accordingly sends the notify message to the CN-A to notify that the QoS requirements of the established QoS flows cannot be fulfilled anymore. In an embodiment, the notify message should include at least one of the following information:

the measurement results of QoE;
    an indication of whether the QoS requirements are fulfilled;
    the ID(s) of QoS flows of which the QoS requirements cannot be fulfilled;
    ID of target RAN (e.g., RAN-B) recommended by the UE.

Case b:

In step 505b, the RAN-A itself detects that QoS requirements cannot be fulfilled and/or an RLF is detected and the RAN-A sends the notify message to the CN-A to notify that the QoS requirements of the established QoS flows cannot be fulfilled anymore and to indicate that the established 3GPP access PDU session should be released, where the message should include at least one of the following items:

the measurement results of QoE;
    an indication of whether the QoS requirements have been fulfilled;
    information of QoS flows that the QoS requirements cannot be fulfilled;
    information related to established PDU session that is to be released.

In step 506, after receiving the notify message from the RAN-A (i.e., after step 505a-2 or 505b), the CN-A may send a NAS message to request the UE to establish connection in the target RAN node (i.e., RAN-B). As an alternative or in addition, the CN-A may transmit a NGAP message to the RAN-A to trigger the handover to the target RAN node (i.e., RAN-B) and the RAN-A sends a(n) (RRC) reconfiguration message to the UE for performing the handover to the target RAN for service continuity.

In step 507, the 3GPP access PDU session and/or non-3GPP access PDU session in the target RAN (i.e., RAN-B) for UE towards the CN-A or CN-B are established.

In step 508, the handover is performed. The handover may be from the non-3GPP access PDU session in the source RAN (i.e., RAN-A) to the 3GPP access PDU session in target RAN (i.e., RAN-B). As an alternative, the handover may be from the 3GPP access PDU session in the source RAN (i.e., RAN-A) to the non-3GPP access PDU session in the target RAN (i.e., RAN-B).

Embodiment 3

Figure 6:
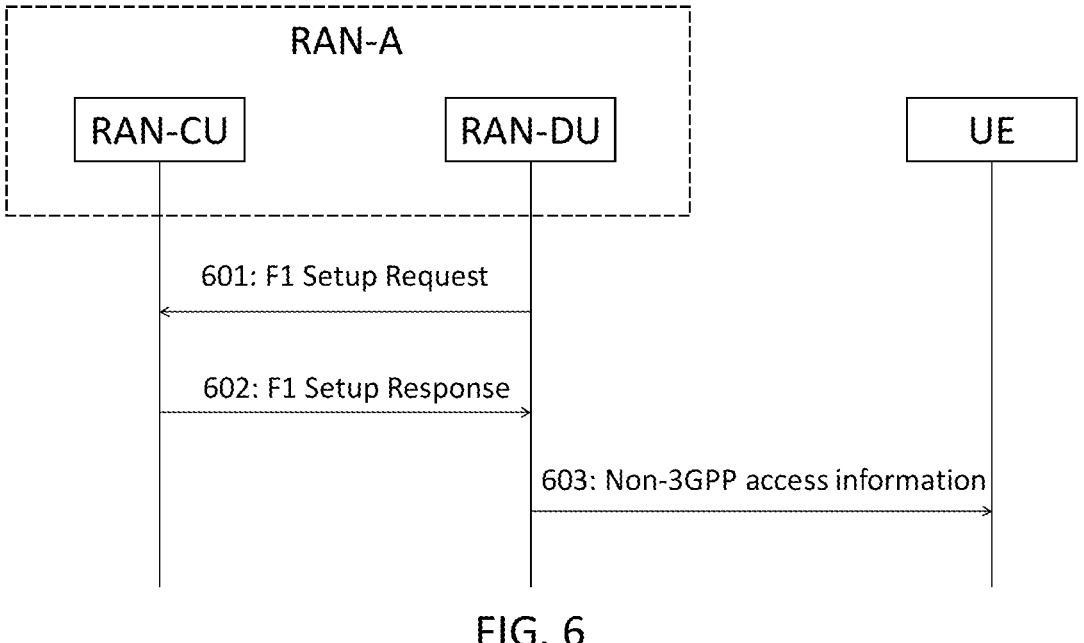
FIG. 6 shows a schematic diagram of a procedure according to an embodiment of the present disclosure.

FIG. 6 shows a schematic diagram of a procedure according to an embodiment of the present disclosure. The procedure shown in FIG. 6 relates to step 400 of Embodiment 1 or step 500 of Embodiment 2 in the scenario where the RAN-A is deployed as CU-DU (centralized unit-distributed unit) split. In FIG. 6, the CU of the RAN-A and the DU of the RAN-A are represented respectively by RAN-CU and RAN-DU.

More specifically, the RAN-DU sends an F1 Setup Request message to the RAN-CU, to setup an F1 interface between the RAN-CU and RAN-DU (step 601). In this embodiment, the F1 Setup Request message includes the non-3GPP access information in the cell information for the specific cell, wherein the non-3GPP access information in the cell information includes at least one of the following items:

an indication of whether the cell of the Network A supports the UE to connect to the Network B via the N3IWF;
  supported Network B information, which includes one or more Network B IDs of the non-3GPP accessed Network B supported by the cell of the Network A via the N3IWF;
  supported service types that require service continuity by the cell (e.g., VIAPA service).

In step 602, the RAN-CU configures and encodes the non-3GPP access information for broadcasting in one or more cells based on the above received non-3GPP access information. Next, the RAN-CU sends the configured/encoded non-3GPP access information for broadcasting in one or more cells to the RAN-DU in an F1 Setup Response message.

Step 3: The RAN-DU broadcasts (e.g., transmits) the received configured/encoded non-3GPP access information to the UE.

Embodiment 4

Figure 7:
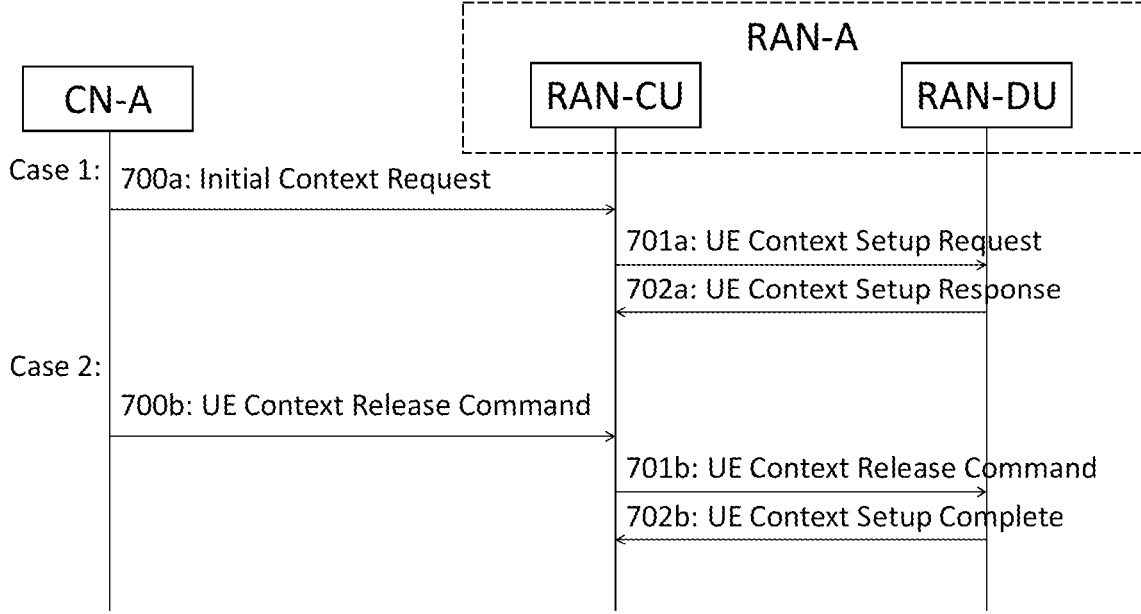
FIG. 7 shows a schematic diagram of procedures according to an embodiment of the present disclosure.

FIG. 7 shows a schematic diagram of procedures according to an embodiment of the present disclosure. The procedures shown in FIG. 7 relates to the transfer of inactive mode indication information in F1 application protocol (AP), e.g., in step 403 of Embodiment 1. The procedures could be divided into two kinds of cases.

In case 1, the RAN-CU carries the inactive mode indication in the UE Context Setup Request message to the RAN-DU. Thus, when the RAN-DU sends the RRC Release message to the UE, the RRC Release message also carries the inactive mode indication for UE to release the UE to the inactive mode.

In case 2, the RAN-CU would not send the inactive mode indication to the RAN-DU until sending the UE Context Release Command to the RAN-DU, wherein the UE Context Release Command comprises the inactive mode indication. Accordingly, the RAN-DU may notice the UE to release to the inactive mode in the RRC Release message.

More details of case 1 and 2 are illustrated in the following:

Case 1:

In step 701a, the RAN-CU sends the UE Context Setup Request message to the RAN-DU, wherein the UE Context Setup Request message carries the inactive mode indication indicating that UE should be (always) released to the inactive mode (e.g., in order to keep the service continuity).

In step 702a, the RAN-DU sends RAN-CU UE Context Setup Response message to the RAN-CU.

Case 2:

In step 701b, the RAN-CU sends, to the RAN-DU, the UE Context Release Command message. In an embodiment, the UE Context Release Command message comprises an inactive mode indication indicating that UE is always released to the inactive mode (e.g., in order to keep the service continuity).

In step 702b, the RAN-DU is aware that UE is going to enter the inactive mode and the RAN-DU may keep the UE context. The RAN-DU sends the UE Context Release Complete message to the RAN-CU.

In an embodiment, the present disclosure proposes a method for maintaining service continuity between the network A and the network B. Note, the network A and the network B are networks of different types. For example, the Network A could be a PLMN and the Network B could be an SNPN. As an alternative, the network A could be an SNPN and the network B could be a PLMN. In this embodiment, the method comprises:

the gNB of serviced RAN sending a paging message to a UE, to page a UE as well as resuming data services of the network A and/or network B via the serviced RAN; and
  the gNB of serviced RAN sending a message to a core network (e.g., 5GC) of the serviced RAN, to notify the data services in the serviced RAN is not fulfilled as well as resuming data services of the network A and/or the network B via another RAN.

Note that, the service RAN may be one of the network A or the network B.

In an embodiment, the gNB of serviced RAN (e.g., network A) sends an NGAP message to the core network, to request resources for the data services that require service continuity. In an embodiment, the NGAP message comprises an indication indicating that the UE could only be released to an inactive mode (e.g., RRC_Inactive). In an embodiment, the NGAP message contains at least one of the following information:

an indication indicating that the UE is always released to the inactive mode;
  selected network B information, which includes one or more IDs of the network B supported and/or selected by the UE (if the network B is the PLMN, the Network B ID comprises a PLMN ID; if the network B is the SNPN, the network B ID comprises a PLMN ID and an NID);
  (indication(s) of) service type(s) requiring service continuity (e.g., VIAPA).

In an embodiment, the core network of the serviced RAN (e.g., Network A) sends an NGAP message to the gNB of the serviced RAN to establish PDU session resources for 3GPP access for the network A services and/or non-3GPP access for Network B services. In this embodiment, the NGAP message include at least one of the following information:

an indication indicating that the UE is always released to the inactive mode;
  selected Network B ID for non-3gpp access;
  (indication(s) of) service type(s) requiring service continuity (e.g., VIAPA service);
  setup PDU session information for 3GPP access;
  setup PDU session information for non-3GPP access.

In an embodiment, after the PDU session(s) is established in the serviced RAN (e.g., Network A), when the gNB of the serviced RAN decides to release the UE (e.g., when there is no data traffic from the core network for some period, the gNB of the serviced RAN can derive whether it is preferred to release the UE to the inactive mode by transmitting a received inactive indication. In an embodiment, the gNB of the serviced RAN may determine sending the UE to the inactive mode based on the NGAP message transmitted from the core network of the serviced RAN (e.g., the indication indicating that the UE is always released to the inactive mode). As an alternative or in addition, the gNB of the serviced RAN derives sending the UE to the inactive mode based on QoS flow information in the setup PDU session information and/or the received the service types that require service continuity.

In an embodiment, the gNB in the serviced RAN sends a paging message to the UE, wherein the paging message includes the paging network information indicating that which network pages the UE (e.g., the paging message is from the network A or the network B).

After receives paging message, if there is no existing PDU session towards the paging network (e.g., the network A or the network B) in serviced RAN, the UE triggers a PDU session establish procedure towards the core network of the paging network. Otherwise, the UE resumes to connected mode and resumes data traffic transfer of the existing PDU session towards the paging network.

In an embodiment, the gNB of the serviced RAN receives measurement report(s) from the UE. The measurement report includes at least one of the following items:

the measurement results of QoE;

an indication of noticing the gNB whether the QoS requirements have been fulfilled;

ID(s) of QoS flow(s) of which the QoS requirements cannot be fulfilled;

ID(s) of non-3GPP access network B recommended by UE.

Based on the measurement report(s), the gNB sends a PDU session Resource Notify message to the core network of the serviced RAN, to notify that (the QoS requirements of) the established QoS flows of the PDU session cannot be fulfilled anymore.

In an embodiment, the gNB of the serviced RAN itself detects that the QoS requirements cannot be fulfilled anymore and/or an RLF happening between the UE and the gNB and the gNB sends a PDU session Resource Notify message to the core network of the serviced RAN to notify that (the QoS requirements of) the already established QoS flows cannot be fulfilled anymore.

In an embodiment, the PDU session Resource Notify message includes at least one of the following items:

measurement results of QoE;

an indication which notices (e.g., notify) the core network whether the QoS requirements are fulfilled;

information of QoS flows whose the QoS requirements are not fulfilled;

information about already established 3GPP access PDU session which may be released.

After sending the PDU session Resource Notify message to the core network of the serviced RAN, the gNB of the serviced RAN receives an NGAP message, including an indication indicating a handover of the existing PDU session in the serviced RAN to a target RAN (e.g., the network B).

In an embodiment of the gNB of the serviced RAN is deployed as CU-DU split, the DU of the gNB (i.e., gNB-DU) sends an F1 Setup Request message to the CU of the gNB (i.e., gNB-CU) to setup the F1 interface between the gNB-DU and the gNB-CU, wherein the F1 Setup Request message includes non-3GPP access information in the cell information of the specific cell for broadcasting. The non-3GPP access information in the cell information includes at least one of the following items:

an indication of whether the cell of Network A can support the UE to connect to Network B via N3IWF;

supported Network B via N3IWF information, which includes one or more network B IDs of the non-3GPP accessed network B supported by the cell of Network A;

supported service types that require service continuity by the cell (e.g., VIAPA service).

After receiving the F1 Setup Request message, the gNB-CU configures and encodes the non-3GPP access information for broadcasting in one or more cell based on the received information sent by the gNB-DU. Next, the gNB-CU sends the configured/encoded non-3GPP access information broadcast information for broadcasting in one or more cells to the gNB-DU in a F1 Setup Response message. The gNB-DU therefore can broadcast the non-3GPP access information to the UE.

FIG. 8 shows a flowchart of a process according to an embodiment of the present disclosure. The process shown in FIG. 8 may be used in a first wireless network node (e.g., RAN-A) of a first network (e.g., network A) and comprises the following steps:

Step 801: Establish, for at least one service, connections between a wireless terminal and a first core network of the first network and between the wireless terminal and a second core network of one of the at least one second network;

Step 802: Transmit, to the wireless terminal, a release message of releasing the wireless terminal to an inactive mode;

Step 803: Transmit, to the wireless terminal, a paging message associated with a paging core network;

Step 804: Transmit, to the first core network, a notify message associated with a handover event associated with handing at least one handover connecting in the connections to a second wireless network node of the second network.

In FIG. 8, for at least one service, the first wireless network node establishes connections between a wireless terminal (e.g., UE) and a first core network (e.g., CN-A) of the first network and between the wireless terminal and a second core network (e.g., CN-B) of one of the at least one second network (e.g., network B). In this embodiment, the first network is one of the PLMN and NPN (e.g., SNPN) and the second network is another one of the PLMN and the NPN. After establishing the connections, the first wireless network node transmits a release message to the wireless terminal, to release the wireless terminal to an inactive mode (e.g., RRC_INACTIVE). In this embodiment, the first wireless network node may transmit a paging message associated with (e.g., from) a paging core network, wherein the paging core network could be one of the first core network and the second core network. That is, (data services of) both the first core network and the second core network are able to page the wireless terminal. In this embodiment, the first wireless network node may transmit a notify message to the first core network, to indicate a handover event associated with handing at least one handover connecting in the connections to a second wireless network node (e.g., RAN-B) of the second network. For example, the handover event may be that the QoS requirements of the at least one handover connection are not fulfilled.

In an embodiment, the at least one handover connection comprise the connection between the wireless terminal and the first core network (i.e., the 3GPP access connection of the first wireless network node). In this embodiment, the 3GPP access connection is handed to the second wireless network node (i.e., to a non-3GPP access connection between the wireless terminal and the first core network via the second wireless network node).

In an embodiment, the at least one handover connection comprise the connection between the wireless terminal and the second core network (i.e., the non-3GPP access connection of the first wireless network node). In this embodiment, the non-3GPP access connection is handed to the second wireless network node (i.e., to a 3GPP access connection between the wireless terminal and the first core network through the second wireless network node).

In order to establish the connections, the first wireless network node transmits, to the first core network, an initial message of requiring resources for the at least one service, and/or receives, from the first core network, a resource setup request message of establishing the connections between the wireless terminal and the first core network and between the wireless terminal and the second core network via the first wireless network node.

In an embodiment, the initial message comprises at least one of:

an indication of keeping the wireless terminal being released to the inactive mode, identifier information of the at least one second network selected by the wireless terminal, or the at least one service.

In an embodiment, the resource setup request message comprises at least one of:

an indication of keeping the wireless terminal being released to the inactive mode, identifier information of one of the at least one second network node, e.g., the second network corresponding to the second core network (e.g., network B), (at least one indication of) the at least one service, setup information for the connection between the wireless terminal and the first core network, or setup information for the connection between the wireless terminal and the second core network.

In an embodiment, the release message is transmitted based on at least one of an indication of keeping the wireless terminal being released to the inactive mode, QoS flow information of the at least one service, or at least one service type of the at least one service.

In an embodiment, the first wireless network node may receive the paging message and/or paging information (e.g., DL data) from the paging network, e.g., before transmitting the paging message to the wireless terminal.

In an embodiment, the first wireless network node transmits data on the connection between the wireless terminal and the paging core network, e.g., after transmitting the paging message to the wireless terminal. The first wireless network node may establish the connection between the wireless terminal and the paging core network after transmitting the paging message.

In an embodiment, the first wireless network node may receive a request message (e.g., in response to the notify message) from the first core network. The request message indicates at least one handover of handing the at least one handover connection to the second wireless network node. The first wireless network node transmits a reconfiguration message of performing the at least one handover to the wireless terminal.

In an embodiment, the notify message comprises at least one of:

at least one QoE measurement result of the at least one service, an indication of at least one QoS requirement of the at least one service is unfulfilled, information of at least one QoS flow associated with at least one QoS requirement which is unfulfilled, or information associated with the at least one handover connection.

In an embodiment, the first wireless network node receives at least one measurement report indicating the handover event from the wireless terminal, e.g., before transmitting the notify message to the first core network.

In an embodiment, the at least one measurement report comprises at least one of:

at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

In an embodiment, the first wireless network node may receive a connection request message associated with the at least one service from the wireless terminal. The connection request message comprises at least one of:

information associated with the at least one second network selected by the wireless terminal, or (at least one indication of) the at least one service.

In an embodiment, the first wireless network node may transmit (e.g., broadcast) untrusted access information to the wireless terminal. The untrusted access information comprises at least one of:

an indication of whether the first wireless network node supports establishing the connection between the wireless terminal and the at least one second network, identifier information of the at least one second network supported by the first wireless network node, or at least one service type supported by the first wireless network node for establishing the connection between the wireless terminal and the at least one second network.

In an embodiment of the first wireless network node is deployed as CU-DU split, the DU of the first wireless network node transmits the untrusted access information to the CU of the first wireless network node. The CU of the first wireless network node configures and encodes the untrusted access information for broadcasting (e.g., configures/encodes the untrusted access information into SIB and/or MIB) and transmits the configured/encode untrusted access information to the DU of the first wireless network node. The DU of the first wireless node therefore can broadcast the configured/encoded untrusted access information.

Figure 9:
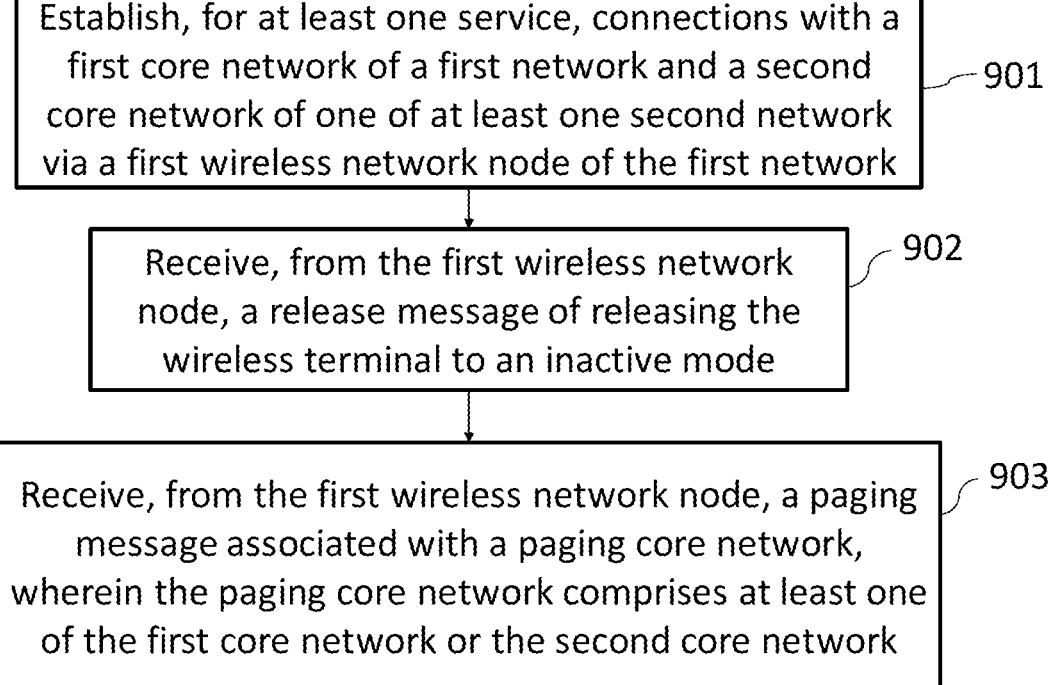
FIG. 9 shows a flowchart of a process according to an embodiment of the present disclosure.

FIG. 9 shows a flowchart of a process according to an embodiment of the present disclosure. The process shown in FIG. 9 may be used in a wireless terminal (e.g., UE) and comprises the following steps:

Step 901: Establish, for at least one service, connections with a first core network of a first network and a second core network of one of at least one second network via a first wireless network node of the first network;

Step 902: Receive, from the first wireless network node, a release message of releasing the wireless terminal to an inactive mode;

Step 903: Receive, from the first wireless network node, a paging message associated with a paging core network, wherein the paging core network comprises at least one of the first core network or the second core network.

In FIG. 9, for at least one service, the wireless terminal establishes connections with a first core network of a first network and a second core network of one of at least one second network via a first wireless network node of the first network. Note that, the first network is one of the PLMN and the NPN (e.g., SNPN) and the second network is another one of PLMN and the NPN. After the connections are established, the wireless terminal receives a release message of releasing the wireless terminal to an inactive mode from the first wireless network node. In this embodiment, the wireless terminal receives a paging message associated with a paging core network from the first wireless network node. The paging core network comprises at least one of the first core network or the second core network.

In an embodiment, the wireless terminal receives untrusted access information associated with the at least one second network from the first wireless network node. The untrusted access information comprises at least one of:

an indication of whether the first wireless network node supports establishing at least one connection between the wireless terminal and the at least one second network, identifier information of the at least one second network supported by the first wireless network node, or at least one service type supported by the first wireless network node for establishing the at least one connection between the wireless terminal and the at least one second network.

In an embodiment, the wireless terminal transmits a connection request associated with the at least one service to the first wireless network node. the connection request message comprises at least one of:

information associated with the at least one second network selected by the wireless terminal, or (at least one indication of) the at least one service.

In an embodiment, the wireless terminal communicates with the paging core network on the connection between the wireless terminal and the paging core network after receiving the paging message. Note that, the connection between the wireless terminal and paging core network may be established after receiving the paging message, e.g., by performing a connection establishment procedure (e.g., PDU session establishment procedure).

In an embodiment, the wireless terminal may receive, from the first network node, a reconfiguration message of performing at least one handover of handing at least one handover connection in the connections between the wireless terminal and the first core network and between the wireless terminal and the second core network to a second wireless network node of the second network.

In an embodiment, the wireless terminal may transmit at least one measurement report indicating a handover event associated with the at least one handover connection to the first wireless network node, e.g., before receiving the reconfiguration message. The at least one measurement report comprises at least one of:

at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

Figure 10:
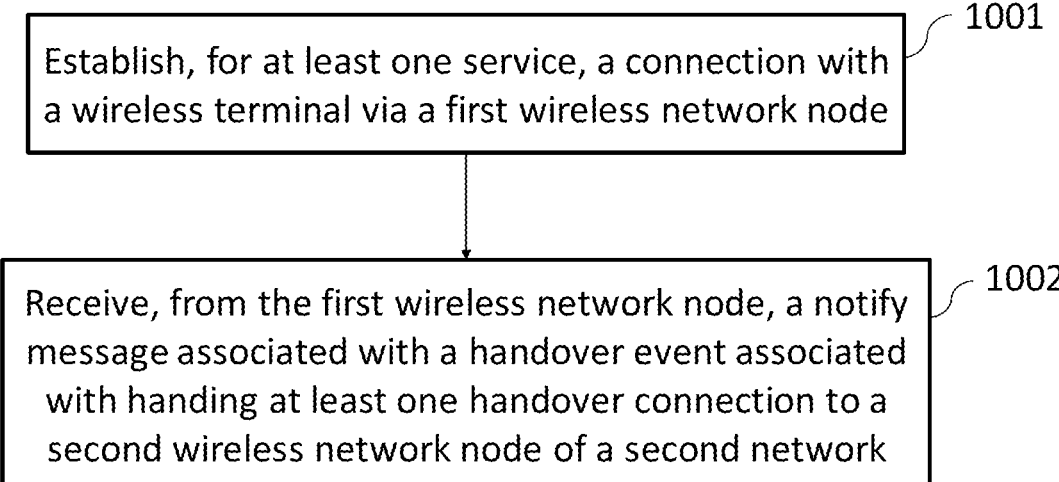
FIG. 10 shows a flowchart of a process according to an embodiment of the present disclosure.

FIG. 10 shows a flowchart of a process according to an embodiment of the present disclosure. The process shown in FIG. 10 may be used in a first core network of a first network (e.g., CN-A of the network A) and comprises the following steps:

Step 1001: Establish, for at least one service, a connection with a wireless terminal via a first wireless network node;

Step 1002: Receive, from the first wireless network node, a notify message associated with a handover event associated with handing at least one handover connection to a second wireless network node of a second network.

In FIG. 10, the first core network establishes a connection with a wireless terminal via a first wireless network node for at least one service. In this embodiment, a connection between the wireless terminal and a second core network of one of at least one second network may also be established via the first wireless network node for the at least one service. The first network is one of the PLMN and the NPN and the second network is another one of the PLMN or the NPN. The first core network receives a notify message associated with a handover event associated with handing at least one handover connection to a second wireless network node of a second network from the first wireless network node. Note that, the at least one handover connection comprises at least one of the connections between the first core network and the wireless terminal and the connection between the second core network of the wireless network via the first wireless network node.

In an embodiment, the first core network receives, from the first wireless network node, an initial message of requiring resources for the at least one service. the initial message comprises at least one of:

an indication of keeping the wireless terminal being released to an inactive mode, identifier information of the at least one second network selected by the wireless terminal, or (at least one indication of) the at least one service.

In an embodiment, the first core network transmits, to the first wireless network node, a resource setup request message of establishing the connections between the wireless terminal and the first core network and between the wireless terminal and the second core network via the first wireless network node. The resource setup request message comprises at least one of:

an indication of keeping the wireless terminal being released to an inactive mode, identifier information of the second network corresponding to the second core network, the at least one service, setup information for the connection between the wireless terminal and the first core network, or setup information for the connection between the wireless terminal and the second core network.

In an embodiment, after receiving the notify message, the first core network transmits, to the first wireless network node or the wireless terminal, a request message indicating at least one handover of handing the at least one handover connection to the second wireless network node.

In an embodiment, the notify message comprises at least one of:

at least one QoE measurement result of the at least one service, an indication of at least one QoS requirement of the at least one service is unfulfilled, information of at least one QoS flow associated with at least one QoS requirement which is unfulfilled, or information associated with the at least one handover connection.

Figure 11:
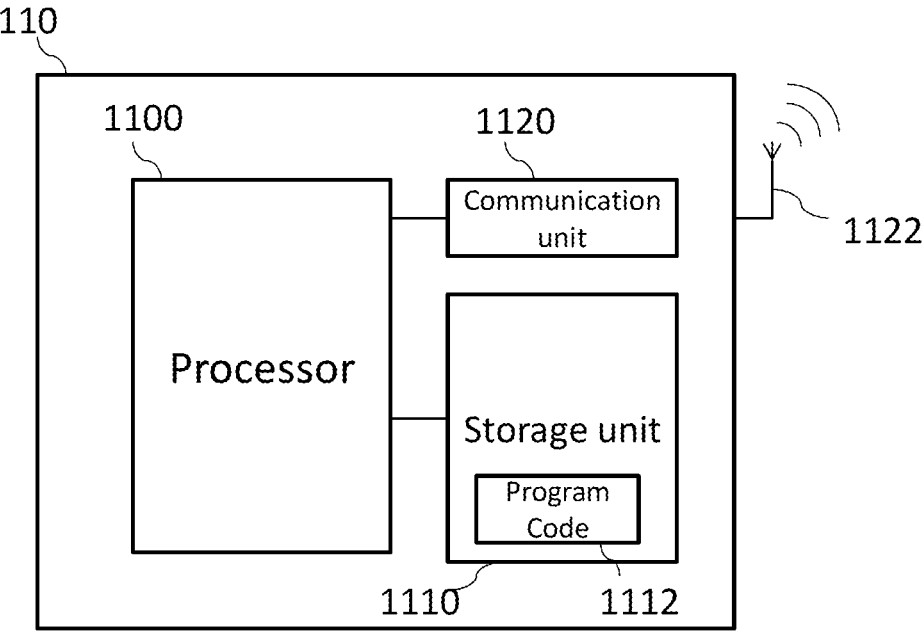
FIG. 11 shows an example of a schematic diagram of a wireless terminal according to an embodiment of the present disclosure.

FIG. 11 relates to a schematic diagram of a wireless terminal 110 according to an embodiment of the present disclosure. The wireless terminal 110 may be a user equipment (UE), a mobile phone, a laptop, a tablet computer, an electronic book or a portable computer system and is not limited herein. The wireless terminal 110 may include a processor 1100 such as a microprocessor or Application Specific Integrated Circuit (ASIC), a storage unit 1110 and a communication unit 1120. The storage unit 1110 may be any data storage device that stores a program code 1112, which is accessed and executed by the processor 1100. Embodiments of the storage unit 1112 include but are not limited to a subscriber identity module (SIM), read-only memory (ROM), flash memory, random-access memory (RAM), hard-disk, and optical data storage device. The communication unit 1120 may a transceiver and is used to transmit and receive signals (e.g., messages or packets) according to processing results of the processor 1100. In an embodiment, the communication unit 1120 transmits and receives the signals via at least one antenna 1122 shown in FIG. 11.

In an embodiment, the storage unit 1110 and the program code 1112 may be omitted and the processor 1100 may include a storage unit with stored program code.

The processor 1100 may implement any one of the steps in exemplified embodiments on the wireless terminal 110, e.g., by executing the program code 1112.

The communication unit 1120 may be a transceiver. The communication unit 1120 may as an alternative or in addition be combining a transmitting unit and a receiving unit configured to transmit and to receive, respectively, signals to and from a wireless network node (e.g., a base station).

Figure 12:
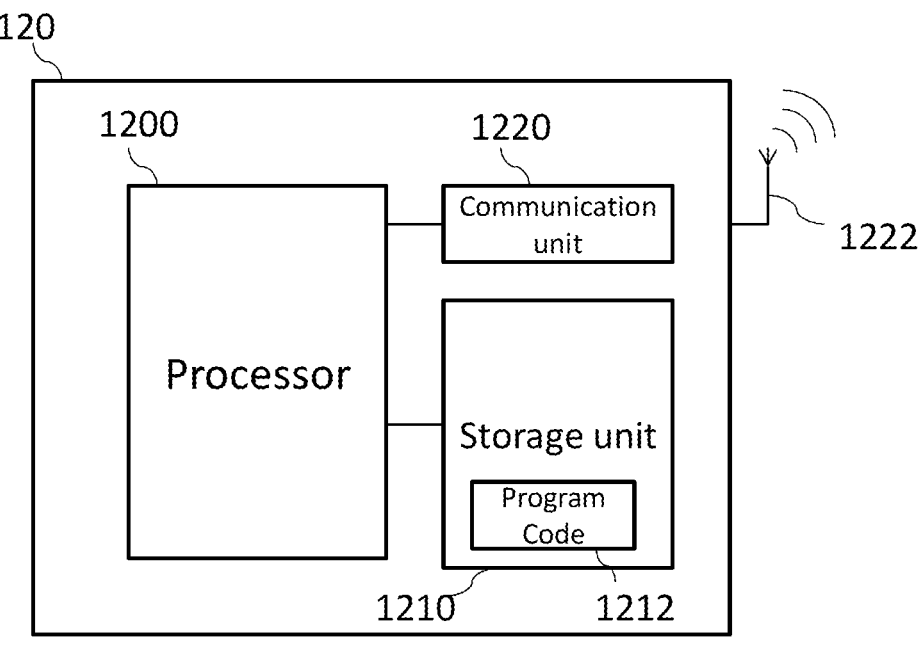
FIG. 12 shows an example of a schematic diagram of a wireless network node according to an embodiment of the present disclosure.

FIG. 12 relates to a schematic diagram of a wireless network node 120 according to an embodiment of the present disclosure. The wireless network node 120 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN), an eNB, an NG-eNB, a gNB, a data network, a core network or a Radio Network Controller (RNC), and is not limited herein. In addition, the wireless network node 120 may comprise (perform) at least one network function such as an access and mobility management function (AMF), a session management function (SMF), a user place function (UPF), a policy control function (PCF), an application function (AF), etc. The wireless network node 120 may include a processor 1200 such as a microprocessor or ASIC, a storage unit 1210 and a communication unit 1220. The storage unit 1210 may be any data storage device that stores a program code 1212, which is accessed and executed by the processor 1200. Examples of the storage unit 1212 include but are not limited to a SIM, ROM, flash memory, RAM, hard-disk, and optical data storage device. The communication unit 1220 may be a transceiver and is used to transmit and receive signals (e.g., messages or packets) according to processing results of the processor 1200. In an example, the communication unit 1220 transmits and receives the signals via at least one antenna 1222 shown in FIG. 12.

In an embodiment, the storage unit 1210 and the program code 1212 may be omitted. The processor 1200 may include a storage unit with stored program code.

The processor 1200 may implement any steps described in exemplified embodiments on the wireless network node 120, e.g., via executing the program code 1212.

The communication unit 1220 may be a transceiver. The communication unit 1220 may as an alternative or in addition be combining a transmitting unit and a receiving unit configured to transmit and to receive, respectively, signals to and from a wireless terminal (e.g., a user equipment).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein but is to be accorded the widest scope consistent with the novel features and principles disclosed herein, as recited in the claims below.

We claim:

1. A wireless communication method for use in a first wireless network node of a first network, the method comprising:

establishing, for at least one service, connections between a wireless terminal and a first core network of the first network and between the wireless terminal and a second core network of one of at least one second network, wherein the first network is one of a public land mobile network or a non-public network and the at least one second network is another one of the public land mobile network or the non-public network, transmitting, to the wireless terminal, a release message of releasing the wireless terminal to an inactive mode, transmitting, to the wireless terminal, a paging message associated with a paging core network, wherein the paging core network comprises at least one of the first core network or the second core network, transmitting, to the first core network, a notify message associated with a handover event of handing at least one handover connection in the connections to a second wireless network node of the second network, wherein the release message is transmitted based on at least one of an indication of keeping the wireless terminal being released to the inactive mode, quality of service flow information of the at least one service, or at least one service type of the at least one service, wherein the method further comprises:

receiving, from the wireless terminal, at least one measurement report indicating the handover event, and wherein the at least one measurement report comprises at least one of: at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

2. The wireless communication method of claim 1, wherein the establishing, for the at least one service, the connections between the wireless terminal and the first core network of the first network and between the wireless terminal and the second core network of one of the at least one second network comprises at least one of:

transmitting, to the first core network, an initial message of requiring resources for the at least one service, or receiving, from the first core network, a resource setup request message of establishing the connections between the wireless terminal and the first core network and between the wireless terminal and the second core network via the first wireless network node.

3. The wireless communication method of claim 2, wherein the initial message comprises at least one of:

an indication of keeping the wireless terminal being released to the inactive mode, identifier information of the at least one second network selected by the wireless terminal, or the at least one service.

4. The wireless communication method of claim 2, wherein the resource setup request message comprises at least one of:

an indication of keeping the wireless terminal being released to the inactive mode, identifier information of the second network corresponding to the second core network, the at least one service, setup information for the connection between the wireless terminal and the first core network, or setup information for the connection between the wireless terminal and the second core network.

5. The wireless communication method of claim 1, further comprising:

receiving, from the paging core network, the paging message.

6. The wireless communication method of claim 1, further comprising:

transmitting data on the connection between the wireless terminal and the paging core network, wherein the connection between the wireless terminal and the paging core network is established after transmitting the paging message to the wireless terminal.

7. The wireless communication method of claim 1, further comprising:

receiving, from the first core network, a request message indicating at least one handover of handing the at least one handover connection to the second wireless network node, and transmitting, to the wireless terminal, a reconfiguration message of performing the at least one handover.

8. The wireless communication method of claim 1, wherein the notify message comprises at least one of:

at least one quality of experience (QoE) measurement result of the at least one service, an indication of at least one quality of service (QoS) requirement of the at least one service is unfulfilled, information of at least one QoS flow associated with at least one QoS requirement which is unfulfilled, or information associated with the at least one handover connection.

9. The wireless communication method of claim 1, further comprising:

receiving, from the wireless terminal, a connection request message associated with the at least one service, wherein the connection request message comprises at least one of:

information associated with the at least one second network selected by the wireless terminal, or the at least one service.

10. The wireless communication method of claim 1, further comprising:

transmitting, to the wireless terminal, untrusted access information, wherein the untrusted access information comprises at least one of:

an indication of whether the first wireless network node supports establishing the connection between the wireless terminal and the at least one second network, identifier information of the at least one second network supported by the first wireless network node, or at least one service type supported by the first wireless network node for establishing the connection between the wireless terminal and the at least one second network, wherein transmitting, to the wireless terminal, the untrusted access information comprises:

transmitting, from a distributed unit of the first wireless network node to a centralized unit of the first wireless network node, the untrusted access information, and transmitting, from the centralized unit to the distributed unit, encoded untrusted access information, and broadcasting, by the distributed unit, the encoded untrusted access information, and wherein the encoded untrusted access information is configured in at least one master information block and/or at least one system information block.

11. A wireless communication method for a wireless terminal, the method comprising:

establishing, for at least one service, connections with a first core network of a first network and a second core network of one of at least one second network via a first wireless network node of the first network, wherein the first network is one of a public land mobile network or a non-public network and the at least one second network is another one of the public land mobile network or the non-public network, receiving, from the first wireless network node, a release message of releasing the wireless terminal to an inactive mode, receiving, from the first wireless network node, a paging message associated with a paging core network, wherein the paging core network comprises at least one of the first core network or the second core network, wherein the release message is received based on at least one of an indication of keeping the wireless terminal being released to the inactive mode, quality of service flow information of the at least one service, or at least one service type of the at least one service, receiving, from the first network node, a reconfiguration message of performing at least one handover of handing at least one handover connection in the connections between the wireless terminal and the first core network and between the wireless terminal and the second core network to a second wireless network node of the second network, and transmitting, to the first wireless network node, at least one measurement report indicating a handover event associated with the at least one handover connection, and wherein the at least one measurement report comprises at least one of:

at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

12. The wireless communication method of claim 11, further comprising:

receiving, from the first wireless network node, untrusted access information associated with the at least one second network, wherein the untrusted access information comprises at least one of:

an indication of whether the first wireless network node supports establishing at least one connection between the wireless terminal and the at least one second network, identifier information of the at least one second network supported by the first wireless network node, or at least one service type supported by the first wireless network node for establishing the at least one connection between the wireless terminal and the at least one second network.

13. The wireless communication method of claim 11, further comprising:

transmitting, to the first wireless network node, a connection request message associated with the at least one service, wherein the connection request message comprises at least one of:

information associated with the at least one second network selected by the wireless terminal, or the at least one service.

14. The wireless communication method of claim 11, further comprising:

communicating with the paging core network on the connection between the wireless terminal and the paging core network.

15. The wireless communication method of claim 14, wherein the connection between the wireless terminal and the paging core network is established after receiving the paging message from the first wireless network node.

16. A first wireless network node of a first network, comprising:

a processor, configured to establish, for at least one service, connections between a wireless terminal and a first core network of the first network and between the wireless terminal and a second core network of one of the at least one second network, wherein the first network is one of a public land mobile network or a non-public network and the at least one second network is another one of the public land mobile network or the non-public network, and a communication unit, configured to:

transmit, to the wireless terminal, a release message of releasing the wireless terminal to an inactive mode, transmit, to the wireless terminal, a paging message associated with a paging core network, wherein the paging core network comprises at least one of the first core network or the second core network, transmit, to the first core network, a notify message associated with a handover event associated with handing at least one handover connection in the connections to a second wireless network node of the second network, wherein the release message is transmitted based on at least one of an indication of keeping the wireless terminal being released to the inactive mode, quality of service flow information of the at least one service, or at least one service type of the at least one service, and receive, from the wireless terminal, at least one measurement report indicating the handover event, and wherein the at least one measurement report comprises at least one of: at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

17. A wireless terminal, comprising:

a processor, configured to establish, for at least one service, connections with a first core network of a first network and a second core network of one of at least one second network via a first wireless network node of the first network, wherein the first network is one of a public land mobile network or a non-public network and the at least one second network is another one of the public land mobile network or the non-public network, and a communication unit, configured to:

receive, from the first wireless network node, a release message of releasing the wireless terminal to an inactive mode, receive, from the first wireless network node, a paging message associated with a paging core network, wherein the paging core network comprises at least one of the first core network or the second core network, wherein the release message is received based on at least one of an indication of keeping the wireless terminal being released to the inactive mode, quality of service flow information of the at least one service, or at least one service type of the at least one service, receive, from the first network node, a reconfiguration message of performing at least one handover of handing at least one handover connection in the connections between the wireless terminal and the first core network and between the wireless terminal and the second core network to a second wireless network node of the second network, and transmit, to the first wireless network node, at least one measurement report indicating a handover event associated with the at least one handover connection, and wherein the at least one measurement report comprises at least one of:

at least one QoE measurement result of the at least one service, an indication of at least one QoS requirement of the at least one service is unfulfilled, information of at least one QoS flow associated with at least one QoS requirement which is unfulfilled, or identifier information of the second wireless network node.

* * * * *